(12) United States Patent
Carothers

(10) Patent No.: US 7,904,689 B1
(45) Date of Patent: Mar. 8, 2011

(54) JUST IN TIME STORAGE ALLOCATION ANALYSIS SYSTEMS AND METHODS

(75) Inventor: Kathy I. Carothers, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 736 days.

(21) Appl. No.: 11/840,211

(22) Filed: Aug. 16, 2007

(51) Int. Cl.
*G06F 12/00* (2006.01)

(52) U.S. Cl. .............. 711/170; 711/E12.001; 711/112; 707/665

(58) Field of Classification Search .......... 707/661, 707/665
See application file for complete search history.

(56) References Cited

U.S. PATENT DOCUMENTS

| | | | | |
|---|---|---|---|---|
| 6,907,607 | B1 * | 6/2005 | Mummert et al. ............ | 718/104 |
| 7,043,606 | B2 * | 5/2006 | Roskind ........................ | 711/118 |
| 2005/0049884 | A1 * | 3/2005 | Hunt et al. ..................... | 705/1 |
| 2005/0149589 | A1 * | 7/2005 | Bacon et al. .................. | 707/206 |
| 2005/0240792 | A1 * | 10/2005 | Sicola et al. .................... | 714/1 |
| 2006/0045039 | A1 * | 3/2006 | Tsuneya et al. ............... | 370/318 |
| 2006/0277287 | A1 * | 12/2006 | McCall et al. ................. | 709/223 |
| 2007/0101053 | A1 * | 5/2007 | Suzuki ........................... | 711/112 |
| 2008/0155205 | A1 * | 6/2008 | Gokhale et al. ............... | 711/154 |
| 2009/0043958 | A1 * | 2/2009 | Kaneda et al. ................. | 711/112 |

* cited by examiner

*Primary Examiner* — Michael C Krofcheck

(57) ABSTRACT

A method for storage allocation analysis is provided. Storage usage is measured for a file system to determine a burn rate. A date is calculated when the storage usage is projected to exceed allocated storage for the file system based on the burn rate. Whether the calculated date is less than an allocation period from the current date is determined. An amount of additional storage is requested in response to determining that the calculated date is less than the allocation period from the current date. The amount of additional storage is based on projecting the burn rate for at least one storage procurement cycle.

20 Claims, 5 Drawing Sheets

| Graphic User Interface 300 | | | | | | |
|---|---|---|---|---|---|---|
| Share Document Files 204 | | | | | | |
| Historical Data 304 | April 14 | April 21 | April 28 | May 5 | May 12 | May 19 |
| Usage (MB) 306 | 491211 | 522393 | 546083 | 5633394 | 590480 | 612216 |
| Peak (MB) 308 | 553575 | 569773 | 580705 | 617566 | 633952 | 655688 |
| Allocated Storage (MB) 310 | 1040702 | 1040702 | 1040702 | 1040702 | 1040702 | 1040702 |
| Percent Usage 312 | 47.2 | 50.2 | 52.5 | 54.1 | 56.7 | 58.8 |
| Weekly Growth (MB) 314 | 0 | 31182 | 23690 | 17311 | 27086 | 21736 |
| Average Weekly Growth (MB) 316 | 0 | 31182 | 27436 | 24061 | 24817 | 24201 |

JUST IN TIME STORAGE ALLOCATION ANALYSIS SYSTEMS AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large enterprises often have various departments that need to store massive amounts of data, such as human resources records, financial records, word processor documents, customer usage records, and web pages. Due to sustained growth of a file system and/or the addition of new functionalities for a file system, the required storage tends to grow over time. Because of the long time period required to procure additional storage and the long lead time associated with allocating the additional storage, some large enterprises allocate large amounts of additional storage to their file systems on an infrequent basis.

However, some file systems may increase their storage usage more rapidly than anticipated, due to sustained growth or increased functionality. The manager of a file system that is using almost all of its allocated storage may have to make an emergency request for an additional storage allocation as a stop-gap. The file system manager may overstate the amount of storage needed due to the emergency conditions and the long time periods required to procure and allocate the additional storage. When responding to an emergency request, a storage allocation manager may not have the data available to determine if the requested amount of storage is a valid amount. Furthermore, the storage allocation manager and this manager's employees may spend significant amounts of time on due diligence, evaluating each emergency request. Meanwhile, other file system managers who previously overstated their needs for additional storage may not be using much of their storage. These circumstances may result in an enterprise incurring significant expenses to procure and allocate additional storage for a requesting file system while another file system is not using a significant amount of its allocated storage. Additionally, the storage allocation manager may not be able to anticipate when additional storage will be required or how much additional storage needs to be procured.

SUMMARY

In one embodiment, the present disclosure provides a method for storage allocation analysis. Storage usage is measured for a file system to determine a burn rate. A date is calculated when the storage usage is projected to exceed allocated storage for the file system based on the burn rate. Whether the calculated date is less than an allocation period from the current date is determined. An amount of additional storage is requested in response to determining that the calculated date is less than the allocation period from the current date. The amount of additional storage is based on projecting the burn rate for at least one storage procurement cycle.

In another embodiment, a system for storage allocation analysis is provided. The system includes a storage allocation tool and a user interface. The storage allocation tool measures storage usage for a file system to determine a burn rate, calculates a date when the storage usage is projected to exceed allocated storage for the file system based on the burn rate, and determines if the calculated date is less than an allocation period from the current date. The user interface requests an amount of additional storage in response to the storage allocation tool determining that the calculated date is less than the allocation period from the current date. The amount of additional storage is based on projecting the burn rate for at least one storage procurement cycle.

In other embodiments, a method is provided for storage allocation analysis. Transient storage usage peaks are measured over time for a file system to determine a peak burn rate. A date is calculated when the transient storage usage peak is projected to exceed allocated storage for the file system based on the burn rate. Whether the calculated date is less than an allocation period from the current date is determined. An amount of additional storage is requested in response to determining that the calculated date is less than the allocation period from the current date. The amount of additional storage is based on projecting the peak burn rate for at least one storage procurement cycle.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
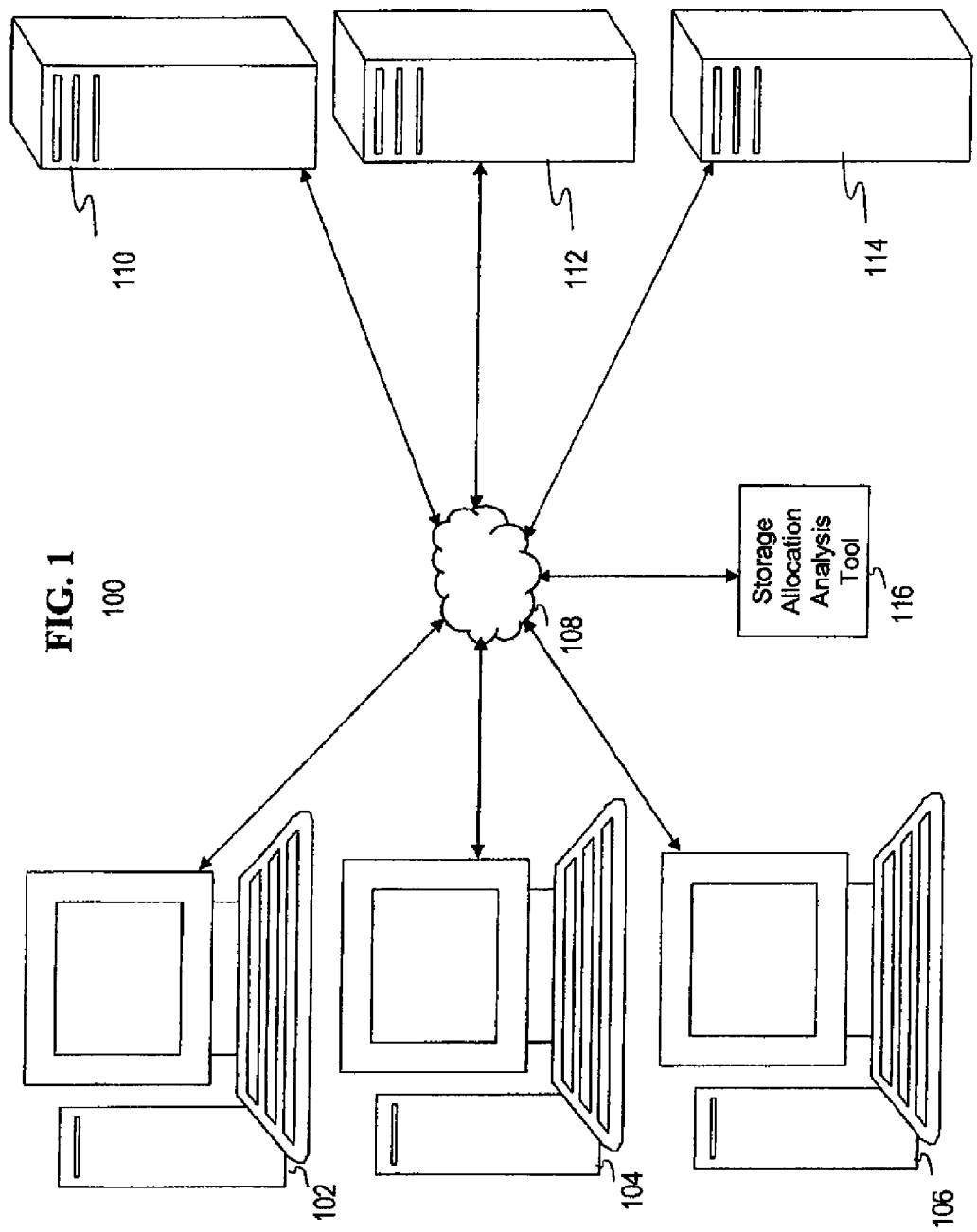
FIG. 1 is a diagram of an enterprise network and storage system according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides various methods and systems of storage allocation analysis. A burn rate measures how fast a file system is increasing its storage usage over time. If the burn rate is negative, which indicates that storage usage is decreasing over time, underutilization can be reduced by reclaiming storage from the file system. Instead of waiting for an emergency request for additional storage, the burn rate is used to calculate a date when the storage usage is likely to exceed the file system's allocated storage. Additional storage is requested if the time to the calculated date is less than the advised time for beginning the process of allocating additional storage. In contrast to a large amount of additional storage that is allocated at infrequent intervals, the amount of additional storage allocated is based on projecting a selected burn rate over a shorter period of time, such as a time period that is sufficient to procure additional storage.

The amount of additional storage allocated is based upon the selected burn rate and the preferred refresh schedule for that class of system (such as 3 months, 4 months, 6 months, 12 months, as an example). The selected burn rate is the then current burn rate or a defined burn rate calculated from an analysis of historical patterns. On the other hand, the refresh schedule is not used to determine when to actually refresh the system, just how much to allocate when a refresh is done. The determination to actually refresh (whether it is ahead of or behind schedule) is instead determined by using the selected burn rate times the minimum allocation time as compared to the current available space. When certain limits are reached in this calculation, a refresh is done. In refreshing the allocation of new storage once again, the amount to be added is based on the preferred/default schedule only, now incorporating the selected burn rate.

Larger file systems are frequently allocated an amount of storage that is sufficiently large to justify the allocation expenses, but smaller than an annual or less frequent allocation amount, thereby reducing the chances of over allocation. Instead of allocating large amounts of storage to each file system, for example once a year, the storage usage is regularly monitored so that a customized amount of storage is allocated to a file system at custom times (only when the usage indicates that the file system will need additional storage). At that point however, the targeted period is again used with the new burn rate to set the amount for the order allocation. Some embodiments adjust the amount of storage allocated for temporary peaks in storage usage, while other embodiments base the burn rate on such peaks.

Turning now to FIG. 1, a diagram of an enterprise network and storage system 100 is depicted according to some embodiments of the present disclosure. The system 100 includes a first computer 102, a second computer 104, and a third computer 106 that can communicate with each other and communicate external to the enterprise via an enterprise network 108. The computers 102-106 can communicate via the enterprise network 108 to store data on and retrieve data from file systems. These file systems can be resident on secondary storage devices, such as a first secondary storage device 110, a second secondary storage device 112, and a third secondary storage device 114. The system 100 also includes a storage allocation analysis tool 116 that monitors and analyzes the storage usage of the file systems. The storage allocation analysis tool 116 can be implemented as a software application running on a computer system or secondary storage device, such as the computer system described below in reference to FIG. 6. The numbers of computers, networks, secondary storage devices, and tools in the system 100 are depicted in FIG. 1 for the purpose of an illustrative example only, as the system 100 can include any number of computers, networks, secondary storage devices, and tools.

Figures 2, 3:
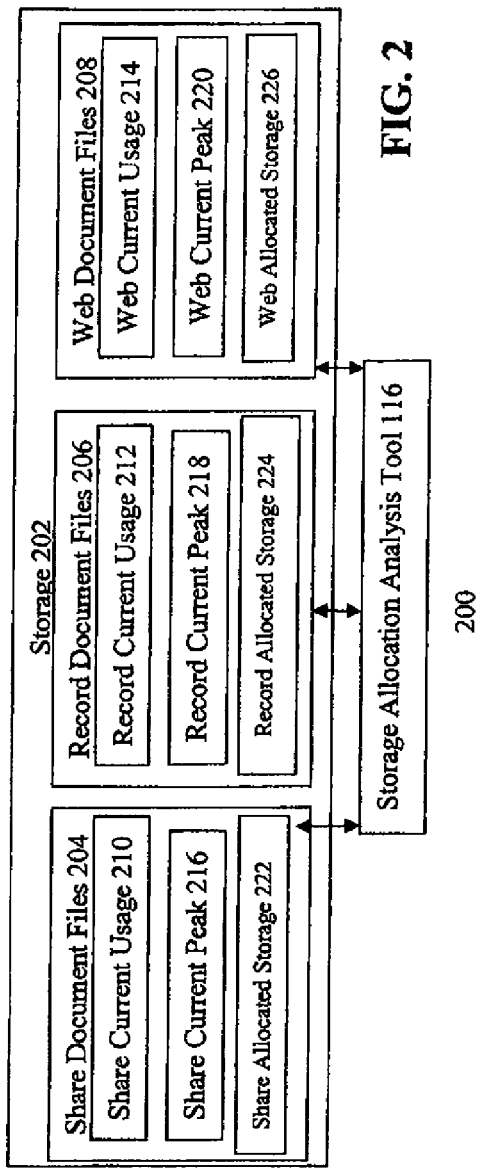
FIG. 2 is a diagram of a storage allocation analysis system according to some embodiments of the present disclosure.
FIG. 3 is a block diagram of a graphic user interface for a storage allocation analysis system according to some embodiments of the present disclosure.

Turning now to FIG. 2, a storage allocation analysis system 200 is depicted according to some embodiments of the present disclosure. The system 200 includes the storage allocation analysis tool 116 and storage 202. Storage 202 contains file system data, such as share document files 204, record document files 206, and web document files 208. For example, the share document files 204 are word processor files for which a large number of enterprise employees share access. In another example, the record document files 206 include human resources records and financial records that are accessible for a limited number of enterprise employees. In yet another example, the web document files 208 are web page files that can be viewed by all enterprise employees but modified only by specific web page developers. The number and types of file systems are exemplary, as storage 202 can include any numbers and types of file systems.

The data for each type of file system can include a current usage for each type of file system, the amount of storage that the file system currently uses, such as a share current usage 210, a record current usage 212, and a web current usage 214. The data for each type of document file system can also include a current peak for the storage usage. The current peak is the highest amount of storage used by the file system within a specified recent time period, such as a share current peak 216, a record current peak 218, and a web current peak 220. Additionally, the data for each type of file system includes a current storage, the amount of storage that is currently available for use by the file system, such as a share allocated storage 222, a record allocated storage 224, and a web allocated storage 226.

Each file system can include its own usage monitoring software that continually monitors storage usage by the file system, such as the current usage, the peaks, and the current available storage, whereby the storage allocation analysis tool 116 periodically retrieves the storage usage data from the usage monitoring software. Alternatively, the storage allocation analysis tool 116 can create its own storage usage data by continually monitoring storage usage for each file system. Furthermore, any combination of self-monitoring and external monitoring of each file system can be implemented. All document files system data can be recorded from the file systems, stored in the storage 202, and displayed to the user of the storage allocation analysis tool 116.

Turning now to FIG. 3, a graphic user interface (GUI) 300 for a storage allocation analysis system is depicted according to some embodiments of the present disclosure. The GUI 300 might contain selectable boxes or similar components corresponding to the data depicted in FIG. 2. A user might manually enter selections of time periods and data types to be viewed into boxes. Alternatively, the boxes might contain drop-down lists or similar components that allow a user to select time periods and data types from predefined lists. The GUI 300 contains a component that automatically displays file system data using the time periods and data types entered or selected by the user. An automated calculation system might be present to calculate percentages for data based on the data types entered.

For example, the GUI 300 displays the share document files 204 data, which includes rows for historical data 304, usage (MB) 306, peak (MB) 308, allocated storage (MB) 310, percent usage 312, weekly growth (MB) 314, and average weekly growth (MB) 316. The historical data 304 lists periods of time, such as a date that represents a time range. For example, the first column of data in FIG. 3 is listed under April 14, which represents the data for the share document files 204 during the week of Sunday April 8 to Saturday April 14. In this example, data is stored on a weekly basis to smooth the data because storing data on a daily basis may result in data that fluctuates too much to be conveniently viewed for trends.

The usage (MB) 306 lists the storage usage in megabytes for the share document files 204. For example, during the week of April 21, the share document files 204 used 522,393 megabytes of storage. The usage (MB) 306 can be an average usage over a period of time, such as the average usage during the week of Sunday April 15 to Saturday April 21, or a representative usage, such as the usage peak at noon on Wednesday April 18.

The peak (MB) 308 lists the peak storage usage in megabytes for the share document files 204. For example, during the week of April 21, the share document files 204 used a maximum of 569,773 megabytes of storage. The allocated storage (MB) 310 lists the storage available in megabytes for the share document files 204. For example, during the week of April 21, the share document files 204 had 1,040,072 megabytes of storage available for usage. Although FIG. 3 depicts a constant storage available for the share document files 204, the allocated storage (MB) 310 can fluctuate as additional storage is allocated to the file system or excess storage is reclaimed from the file system.

The storage allocation analysis tool 116 can calculate the percentage usage 312 by dividing the usage (MB) 306 by the allocated storage (MB) 310. For example, the usage (MB) 306 of 522,393 is divided by the allocated storage (MB) 310 of 1,040,072 to produce the percentage usage 312 of 50.2% for the week of April 21. A very low percentage usage 312 can indicate that a file system has a significant amount of storage available that is not being used, which can be a factor in identifying the file system as a candidate for storage reclamation. A very high percentage usage 312 can indicate that a file system is using almost all of its available storage, which can be a factor in identifying the file system as a candidate for allocation of additional storage.

The weekly growth (MB) 314 lists the weekly increase of storage usage in megabytes for the share document files 204. For example, the share document files 204 increased from 491,211 megabytes of storage used during the week of April 14 to 522,393 megabytes of storage used during the week of April 21, an increase of 31,182 megabytes of storage used. Therefore, the weekly growth (MB) 314 lists 31,182 megabytes for the week of April 21. A negative value for the weekly growth (MB) 314 can indicate that a file system is decreasing the amount of storage used, which can be a factor in identifying the file system as a candidate for storage reclamation. A very large weekly growth (MB) 314 can indicate that a file system is rapidly increasing the amount of storage used, which can be a factor in identifying the file system as a candidate for allocation of additional storage.

The average weekly growth (MB) 316 lists the average weekly increase of storage usage over time, in megabytes for the share document files 204. For example, the share document files 204 had an increase of 31,182 megabytes of storage used for the week of April 21 and an increase of 23,690 megabytes of storage used for the week of April 28. The arithmetic average of 31,182 and 23,690 is 27,436. Therefore, the average weekly growth (MB) 316 lists 27,436 megabytes for the week of April 28. Alternatively, the average can be calculated by assigning weights to each weekly growth (MB) 314, and dividing by a weighted total. For example, the growth for April 21 can be weighted twice because it is the more recent time period, the growth for April 14 can be weighted once because it is the less recent time period, the weighted growths can be added together, and the sum can be divided by the combined weights of three. Continuing this example, 23,690×2=47,380, 31,182×1=31,182, 47,380+31, 182=78,562, and 78,562/3=26,187. The average weekly growth (MB) 316 can be used to calculate a burn rate, which is the change of storage usage over time that is selected to project future storage usage. Alternatively, the average weekly growth (MB) 316 can be based on a comparison over time of the peak (MB) 308, instead of the usage (MB) 306.

A negative value for the average weekly growth (MB) 316 can indicate that over time a file system is decreasing the amount of storage used, which can be a factor in identifying the file system as a candidate for storage reclamation. A very large average weekly growth (MB) 316 can indicate that over time a file system is rapidly increasing the amount of storage used, which can be a factor in identifying the file system as a candidate for allocation of additional storage. The types of data rows and the numbers of data columns in the GUI 300 are depicted in FIG. 3 for the purpose of an illustrative example only, as the GUI 300 can include any type of data row and any number of data columns.

The average weekly growth (MB) 316 may indicate flat or minor growth. Flat or minor growth through one or more procurement cycles may provide an opportunity to reclaim storage. Flat growth trends may indicate that there is over allocated storage and provides an opportunity to reclaim storage. Flat growth is intended to mean growth that is minor, no growth, or that effective purging and archiving strategies are in place.

Figure 4:
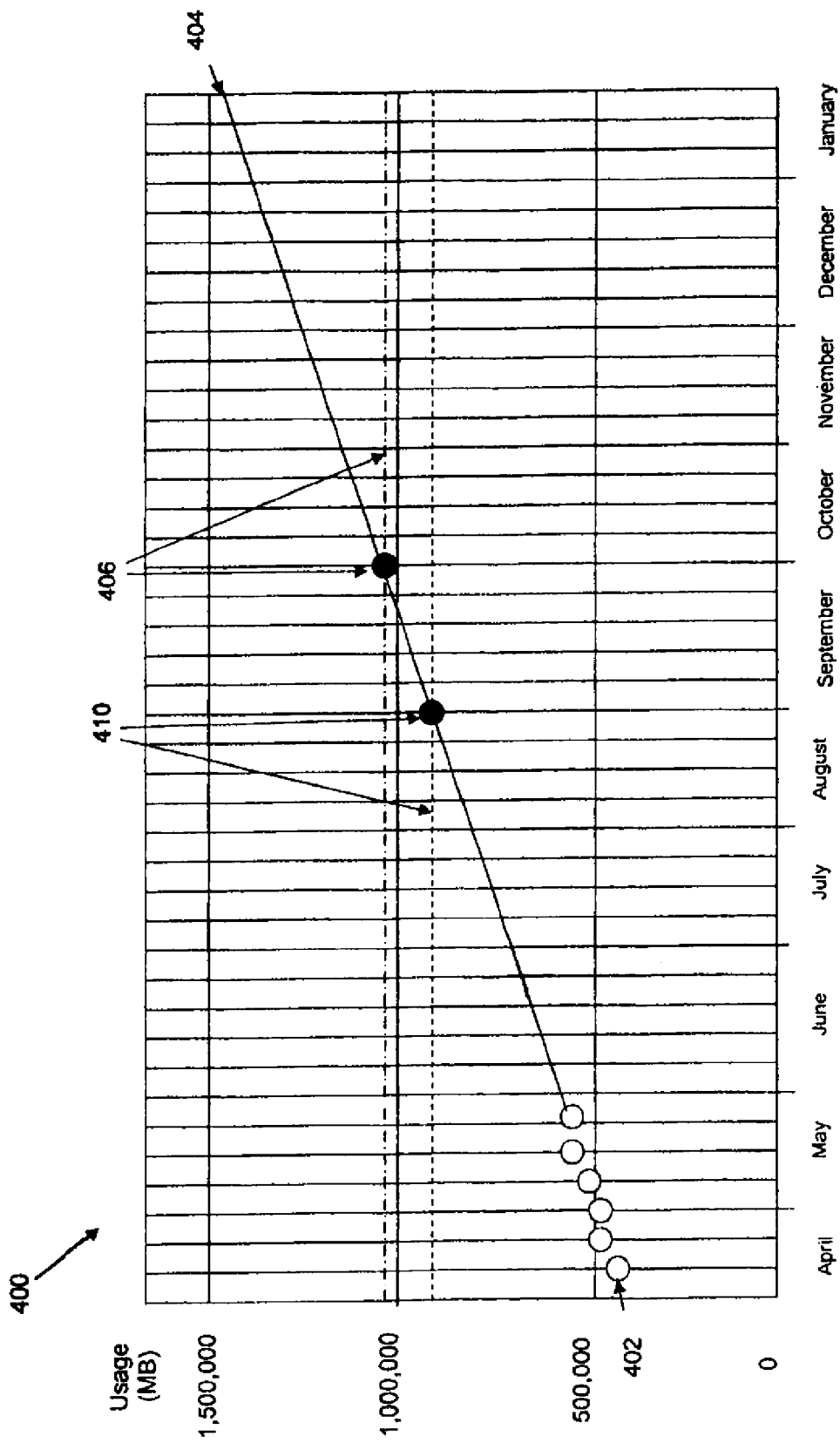
FIG. 4 is a data graph for storage allocation analysis according to some embodiments of the present disclosure.

Turning now to FIG. 4, a data graph 400 for storage allocation analysis is depicted according to some embodiments of the present disclosure. The data graph 400 depicts data for the usage (MB) 306 that is both recorded from the past and projected into the future. For example, the historical data points 402 represent the usage (MB) 306 data for the period from April 14 to May 19, as depicted in FIG. 3. Although the data graph 400 depicts data for weekly periods within each month, the data graph 400 can also depict other time periods. The projection line 404 is the usage (MB) 306 projected to the next January based on using a selected burn rate of 24,201 MB for each week. In this example, the selected burn rate equals the average weekly growth (MB) 316 for May 19, the most recent time period, but other burn rates can be selected, and are constantly being recalculated. The usage (MB) 306 can be projected for more than a year to assist in long-term planning for procurements of additional storage.

An allocation exceeded point 406 represents where the projection line 404 exceeds the allocated storage (MB) 310. The allocation exceeded point 406 corresponds to the time period of September 29, which means that the usage (MB) 306 is projected to exceed the allocated storage (MB) 310 during the week of September 29 based on the burn rate of 24,201 MB for each week. An alarm point 410 is the usage (MB) 306 projected five weeks (although the time period is user selectable) prior to the allocation exceeded point 406, or August 25. In this example, five weeks is selected because the time required for allocating additional storage is five weeks, but the time required for allocating additional storage can be a different amount of time. The alarm point 410 indicates when the process of allocating additional storage should be scheduled, based on a predefined five week storage allocation period and the burn rate of 24,201 MB for each week.

Figure 5:
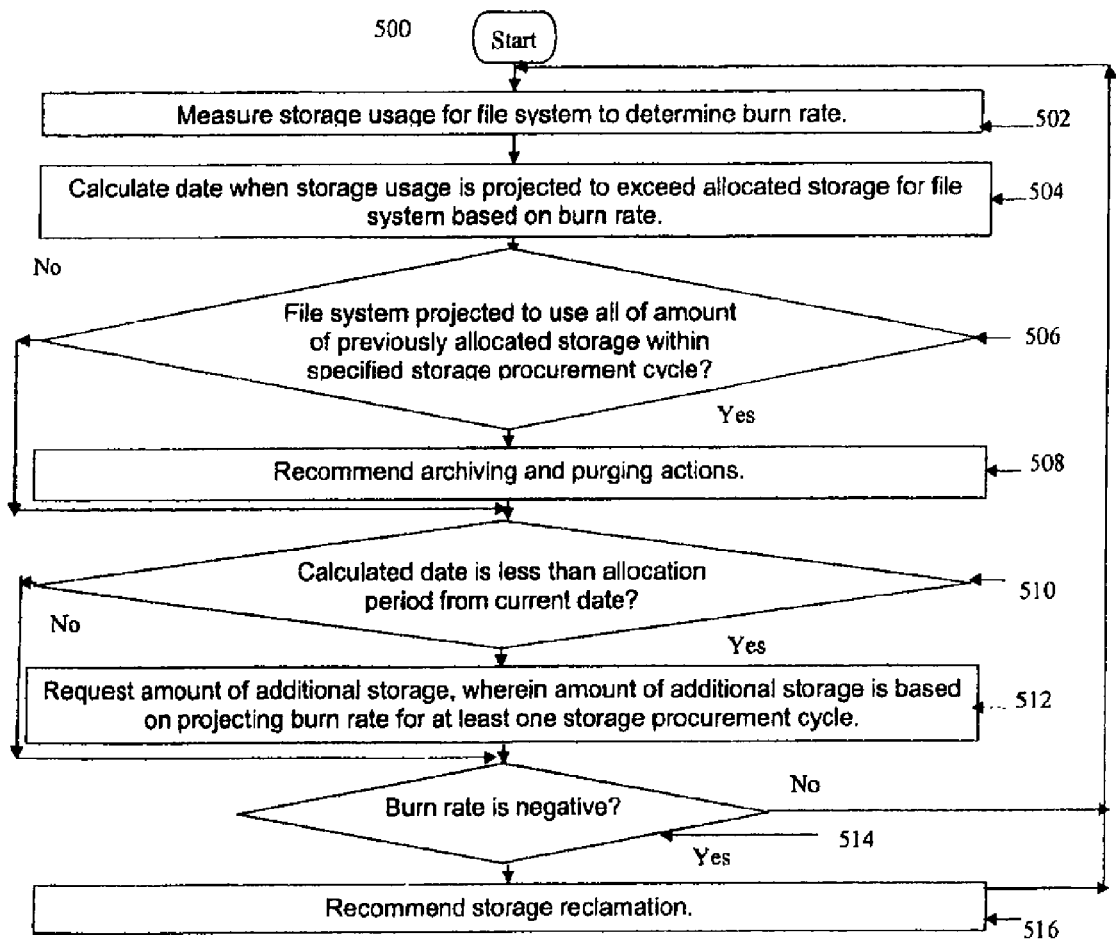
FIG. 5 is a flowchart of a method for storage allocation analysis according to some embodiments of the present disclosure.

An illustrative method 500 for storage allocation analysis is depicted in FIG. 5. The storage allocation analysis tool 116 can execute the method to analyze storage usage and request the allocation of additional storage.

In box 502, the storage allocation analysis tool 116 measures storage usage for a file system to determine a burn rate. For example, the storage allocation analysis tool 116 measures the usage (MB) 306 for the share document files 204 from April 14 to May 19 to determine a burn rate. The burn rate can be the average weekly growth (MB) 316 of 24,201 MB for each week, as listed for the most recent time period of May 19 in FIG. 3.

As an alternative to determining the burn rate based on the most recent time period, the storage allocation analysis tool 116 can effectively validate the accuracy of the projection based on the most recent time period by also evaluating burn rates from other time periods, such as the most recent half storage procurement cycle, the most recent storage procurement cycle, the second most recent storage procurement cycle, and the third and fourth most recent storage procurement cycles. If a higher burn rate or higher peak burn rate is found during one of these earlier periods, this rate could be used instead to minimize the risk of the actual burn rate substantially exceeding the projected burn rate based on the most recent data. For example, if the procurement cycle is three months, the storage allocation analysis tool 116 can select the highest burn rate from the most recent 0 to 6 weeks, the most recent 7 to 13 weeks, 13 to 26 weeks ago, and 26 to 52 weeks ago. It may be useful to evaluate these procurement cycles so that the process effectively takes into account cyclical and seasonal trends. The time periods described are for the purposes of illustrative examples only, as other time periods can be used. By selecting the highest burn rate from various time periods, the storage allocation analysis tool 116 reduces the likelihood that a recent temporary reduction in storage usage does not result in failing to accurately anticipate when additional storage needs to be allocated. Additionally, the storage allocation analysis tool 116 can determine the burn rate based on a combination of time periods that weighs each time period differently. In some embodiments, the burn rate is based on the peak (MB) 308 instead of the usage (MB) 306. Similar to selection of the highest burn rate, the storage allocation analysis tool 116 can select the highest peak (MB) 308 from various time periods, again either an absolute or potentially a weighted average of a set of historical rates.

In box 504, the storage allocation analysis tool 116 calculates a date when the storage usage is projected to exceed the allocated storage for the file system based on the burn rate. For example, the storage allocation analysis tool 116 calculates that the usage (MB) 306 is projected to exceed the allocated storage (MB) 310 for the share document files 204 on September 29, based on the burn rate of 24,201 MB for each week. Burn rates are dynamic and adjusted at measured intervals that in this example are weekly, but could be measured at other intervals such as daily.

Alternatively, the storage allocation analysis tool 116 can calculate a date when the storage usage is projected to exceed the allocated storage by subtracting a storage usage peak from the allocated storage to determine a buffered storage. For example, the peak (MB) 308 for April 14 is 62,364 megabytes more than the usage (MB) 306. Storage usage with a similar amount of peak above usage in the future can mean that usage (MB) 306 will not exceed the allocated storage when the usage (MB) 306 reaches the allocated storage (MB) 310 of 1,040,702, but when the usage (MB) 306 is within 62,364 megabytes of the allocated storage (MB) 310 of 1,040,702, or 978,338 megabytes. Therefore, the storage allocation analysis tool 116 subtracts the storage usage peak of 62,364 megabytes from the allocated storage of 1,040,702 to determine a buffered storage of 978,338 megabytes, which is the point where the usage (MB) 306 will exceed the allocated storage due to the storage usage peak of 62,364 megabytes. The storage usage peak can be a transient storage usage peak, such as a mid-week during the week of April 21, or a pattern storage usage peak, such as a cyclical peak observed each year before April 15 because of the personal income tax filing deadline. A mid-week peak, for example, would identify the highest point for the week by measuring and determining the maximum usage on each day of the week.

In box 506, the storage allocation analysis tool 116 determines whether the file system is projected to use the entire amount of previously allocated storage within a specified storage procurement cycle. For example, the storage allocation analysis tool 116 determines whether the share document files 204 system is projected to use all of the 400,000 megabytes of storage previously allocated six months ago within only three months, or one specified storage procurement cycle. If the storage allocation analysis tool 116 determines that the file system is projected to use the entire amount of additional storage within the specified storage procurement cycle, the method continues to box 508 because the file system is using storage more rapidly than anticipated. If the storage allocation analysis tool 116 determines that the file system is not projected to use the entire amount of additional storage after the specified storage procurement cycle, the method proceeds to box 510 because the file system is not using storage more rapidly than anticipated.

In box 508, the storage allocation analysis tool 116 recommends archiving and purging actions based on, for example, user defined retention policies, file aging, frequency of access, or duplicate documents. For example, because the share document files 204 system is projected to use the 400,000 megabytes of previously allocated storage more rapidly than anticipated, the storage allocation analysis tool 116 recommends archiving and purging actions. The share document files 204 system may be projected to use the 400,000 megabytes of previously allocated storage more rapidly than anticipated because the share document files 204 system did not properly archive document files that are infrequently used or did not purge document files that are redundant.

In box 510, the storage allocation analysis tool 116 determines whether the calculated date is less than the allocation period from the current date. For example, the storage allocation analysis tool 116 determines whether the calculated date of September 29 is less than the allocation period of five weeks from the current date of May 19. If the storage allocation analysis tool 116 determines that the calculated date is less than the allocation period from the current date, the method continues to box 512. When the calculated date is less than the allocation period from the current date, the allocation of additional storage is requested. If the storage allocation analysis tool 116 determines that the calculated date is not less than the allocation period from the current date, the method proceeds to box 514. When the calculated date is not less than the allocation period from the current date, the allocation of additional storage is not requested.

In box 512, the storage allocation analysis tool 116 requests an amount of additional storage, wherein the amount of additional storage is based on projecting the burn rate for at least one storage procurement cycle. The burn rate can be the burn rate based on the most recent time period, or the storage allocation analysis tool 116 can select the highest burn rate from various time periods. By selecting the highest burn rate from various time periods, the storage allocation analysis tool 116 reduces the likelihood that a recent temporary reduction in storage usage does not result in failing to allocate a sufficient amount of additional storage. Additionally, the storage allocation analysis tool 116 can determine the amount of additional storage to allocate based on a combination of time periods that weighs each time period differently. In some embodiments, the amount of additional storage to allocate is based on the peak (MB) 308 instead of the usage (MB) 306.

Similar to the allocation of additional storage based on the burn rate, the storage allocation analysis tool 116 can select the highest peak (MB) 308 from various time periods. In one example, because one storage procurement cycle requires thirteen weeks, the storage allocation analysis tool 116 projects the burn rate of 24,201 MB for each week for thirteen weeks to result in a request for at least 314,613 megabytes of additional storage. In addition to the 314,613 megabytes of requested storage, the storage allocation analysis tool 116 can also request 62,364 megabytes based on the peak above storage usage for the week of April 14.

Due to the expenses incurred in actually allocating storage, the amount of additional storage that the storage allocation analysis tool 116 requests can be based on the magnitude of the file system, which can be measured by the usage (MB) 306. For example, a storage usage of more than 500,000 megabytes can be considered a large storage usage, a storage usage of less than 100,000 megabytes can be considered a small storage usage, and a storage usage between 100,000 megabytes to 500,000 megabytes can be considered a medium storage usage. The small, medium, and large storage usage sizes noted are arbitrary and can be user defined, and are presented for the purpose of an illustrative example only.

Continuing this example, the amount of additional storage allocated for a file system with a large storage usage is based on only one storage procurement cycle because the burn rate for a large storage usage projected for only one storage procurement cycle will still be sufficiently large to justify the expenses incurred in allocating additional storage. However, this amount of additional storage allocated for a file system with a large storage usage is significantly smaller than the amount of additional storage that would be allocated for the file system on an infrequent (annual) basis. Allocating this relatively smaller amount of additional storage reduces the chances that much of the storage that is allocated will be unused for a significant amount of time or never used, reducing the likelihood for the need of reclamation as well as maintaining optimal utilization ratios, and reducing the total cost of ownership of the storage footprint.

Further to this example, the amount of additional storage allocated for a file system with a small storage usage is based on four storage procurement cycles because the burn rate for a small storage usage has to be projected for four storage procurement cycle to be sufficiently large to justify the expenses incurred in allocating additional storage. The amount of additional storage allocated for a file system with a medium storage usage is based on two storage procurement cycles because the burn rate for a medium storage usage has to be projected for at least two storage procurement cycle to be sufficiently large to justify the expenses incurred in allocating additional storage. Similar to the allocations for file systems with large storage usage, the amount of additional storage allocated for a file system with a medium storage usage is significantly smaller than the amount of additional storage that would be allocated for the file system on an infrequent (annual) basis. Likewise, allocating this relatively smaller amount of additional storage reduces the chances that much of the storage that is allocated will be unused for a significant amount of time or never used.

In box 514, the storage allocation analysis tool 116 determines whether the burn rate is negative. For example, the storage allocation analysis tool 116 determines whether the highest burn rate from the most recent 0 to 6 weeks, the most recent 7 to 13 weeks, 13 to 26 weeks ago, and 26 to 52 weeks ago is a negative number. If the storage allocation analysis tool 116 determines that the burn rate is negative, the method continues to box 516 because the usage (MB) 306 for the file system is declining over time. If the storage allocation analysis tool 116 determines that the burn rate is not negative, the method returns to box 502 because the usage (MB) 306 for the file system is not declining over time.

In box 516, the storage allocation analysis tool 116 recommends storage reclamation. For example, the storage allocation analysis tool 116 recommends storage reclamation for the file system with the usage (MB) 306 that is declining over time or that has excess storage allocated to exceed one allocation or procurement cycle or other user defined reclamation rules, based on the burn rate and file system size. The amount of storage that can be reclaimed from such a file system is required to be a significant amount to justify the expenses incurred in reclaiming allocated storage.

Figure 6:
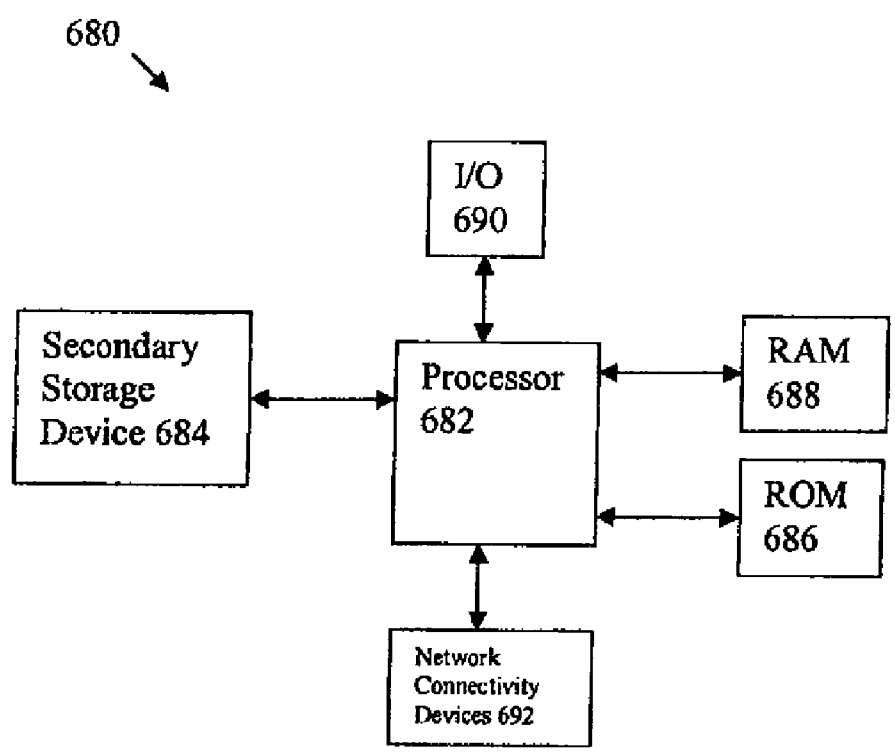
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage devices 684, read only memory (ROM) 686, random access memory (RAM) 688, input/output (I/O) 690 devices, and network connectivity devices 692. The processor may be implemented as one or more CPU chips.

The secondary storage device 684 is typically comprised of one or more internal, external, or network attached storage devices and is used for non-volatile storage of data and as an over-flow data storage device if RAM 688 is not large enough to hold all working data. Secondary storage devices 684 may be used to store programs that are loaded into RAM 688 when such programs are selected for execution. The ROM 686 is used to store instructions and perhaps data that are read during program execution. ROM 686 is a non-volatile memory device that typically has a small memory capacity relative to the larger memory capacity of secondary storage. The RAM 688 is used to store volatile data and perhaps to store instructions. Access to both ROM 686 and RAM 688 is typically faster than to secondary storage devices 684.

I/O 690 devices may include, but is not limited to, printers, video monitors, liquid crystal displays (LCDs), touch screen displays, keyboards, keypads, switches, dials, mice, track balls, voice recognizers, card readers, paper tape readers, or other well-known input/output devices. The network connectivity devices 692 may take the form of modems, modem banks, ethernet cards, universal serial bus (USB) interface cards, serial interfaces, token ring cards, fiber distributed data interface (FDDI) cards, network interface cards (NIC), host bus adapters (HBA), switches, routers, wireless local area network (WLAN) cards, radio transceiver cards such as code division multiple access (CDMA) and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embedded in a carrier wave.

Such information, which may include data or instructions to be executed using processor 682 for example, may be received from and outputted to the network, for example, in the form of a computer data baseband signal or signal embedded in a carrier wave. The baseband signal or signal embedded in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts that it accesses from internal, external, or network attached storage devices, floppy disk, optical disk (these various disk based systems may all be considered secondary storage devices 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for storage allocation analysis, comprising:
   measuring storage usage for a file system to determine a burn rate;
   calculating a date when the storage usage is projected to exceed allocated storage for the file system based on the burn rate;
   determining if the calculated date is less than an allocation period from the current date; and
   requesting an amount of additional storage in response to determining that the calculated date is less than the allocation period from the current date, wherein the amount of additional storage is based on projecting the burn rate for at least one storage procurement cycle and wherein the allocation period is an estimated time period for completion of procurement of additional storage.

2. The method of claim 1, wherein determining the burn rate comprises assigning a weight to each measured storage usage based on a proximity of a date of measurement for each measured storage usage to a current date.

3. The method of claim 1, wherein the amount of additional storage provides for a pattern storage usage peak.

4. The method of claim 1, wherein the amount of additional storage provides for a transient storage usage peak.

5. The method of claim 1, wherein the amount of additional storage is based on projecting the burn rate for one storage procurement cycle.

6. The method of claim 5, further comprising determining if the file system is projected to use all of an amount of a previously allocated storage within one storage procurement cycle; and
   recommending archiving and purging actions in response to determining that the file system is projected to use all of the amount of the previously allocated storage within one storage procurement cycle.

7. The method of claim 1, wherein the amount of additional storage is based on projecting the burn rate for two storage procurement cycles.

8. The method of claim 7, further comprising determining if the file system is projected to use all of an amount of a previously allocated storage within two storage procurement cycles; and
   recommending archiving and purging actions in response to determining that the file system is projected to use all of the amount of the previously allocated storage within two storage procurement cycles.

9. The method of claim 1, wherein the amount of additional storage is based on projecting the burn rate for four storage procurement cycles.

10. The method of claim 9, further comprising determining if the file system is projected to use all of an amount of a previously allocated storage within four storage procurement cycles; and
    recommending archiving and purging actions in response to determining that the file system is projected to use all of the amount of the previously allocated storage within four storage procurement cycles.

11. The method of claim 1, wherein measuring storage usage comprises collecting storage usage data on a periodic basis and aggregating for trending.

12. The method of claim 1, wherein measuring storage usage comprises collecting storage usage data for at least one year.

13. The method of claim 1, wherein determining the burn rate comprises selecting a highest burn rate from time periods of a most recent half storage procurement cycle, a most recent storage procurement cycle, a second most recent storage procurement cycle, and a third and fourth most recent storage procurement cycles.

14. The method of claim 1, further comprising determining if the burn rate is one of negative or flat; and
    recommending storage reclamation in response to determining that the burn rate is one of negative or flat.

15. The method of claim 1, wherein the storage usage is projected for at least an extended allocation period based on the burn rate to project future storage allocations.

16. A method for storage allocation analysis, comprising:
    measuring a transient storage usage peak for a file system to determine a burn rate;
    calculating a date when the transient storage usage peak is projected to exceed allocated storage for the file system based on the burn rate;
    determining if the calculated date is less than an allocation period from the current date;
    requesting an amount of additional storage in response to determining that the calculated date is less than the allocation period from the current date, wherein the amount of additional storage is based on projecting the burn rate for at least one storage procurement cycle.

17. The method of claim 16, wherein determining the burn rate comprises assigning a weight to each measured transient storage usage peak based on a proximity of a date of measurement for each measured transient storage usage peak to a current date.

18. The method of claim 16, further comprising:
determining if the burn rate is one of negative or flat; and
recommending storage reclamation in response to determining that the burn rate is one of negative or flat.

19. A method for storage allocation analysis, comprising:
measuring storage usage for a file system to determine a burn rate;
calculating a date when the storage usage is projected to exceed allocated storage for the file system based on the burn rate, wherein calculating the date when the storage usage is projected to exceed allocated storage for the file system based on the burn rate comprises:
subtracting a current storage usage from allocated storage to determine a remaining storage;
dividing the remaining storage by the larger of the burn rate or peak cyclical usage to determine a remaining time period; and
adding the remaining time period to a current date to determine the calculated date;
determining if the calculated date is less than an allocation period from the current date; and
requesting an amount of additional storage in response to determining that the calculated date is less than the allocation period from the current date, wherein the amount of additional storage is based on projecting the burn rate for at least one storage procurement cycle.

20. A method for storage allocation analysis, comprising:
measuring storage usage for a file system to determine a burn rate;
calculating a date when the storage usage is projected to exceed allocated storage for the file system based on the burn rate, wherein calculating the date when the storage usage is projected to exceed allocated storage for the file system based on the burn rate comprises:
subtracting a storage usage peak from allocated storage to determine a buffered storage;
subtracting a current storage usage from the buffered storage to determine a remaining storage;
dividing the remaining storage by the burn rate to determine a remaining time period; and
adding the remaining time period to a current date to determine the calculated date;
determining if the calculated date is less than an allocation period from the current date; and
requesting an amount of additional storage in response to determining that the calculated date is less than the allocation period from the current date, wherein the amount of additional storage is based on projecting the burn rate for at least one storage procurement cycle.

* * * * *